United States Patent [19]

Trocherie et al.

[11] Patent Number: 5,338,111
[45] Date of Patent: Aug. 16, 1994

[54] KITCHEN APPLIANCE, SUCH AS A MIXER PROVIDED WITH A SAFETY RETRACTABLE DETENT

[75] Inventors: Jean-Pierre A. L. Trocherie, Saint Pierre des Nids; Marc G. P. Marriere, Ambrieres les Vallees; Joel Deschamps, Magny le Desert, all of France

[73] Assignee: Moulinex (Societe Anonyme), Bagnolet, France

[21] Appl. No.: 41,993

[22] Filed: Apr. 2, 1993

[30] Foreign Application Priority Data

Apr. 30, 1992 [FR] France .................. 92 05363

[51] Int. Cl.$^5$ .................. B01F 13/04; B02C 18/12
[52] U.S. Cl. .................. 366/205; 366/314; 241/282.1
[58] Field of Search .................. 241/199.2, 199.12, 277, 241/282.1, 282.2; 99/348; 366/96–98, 197, 199, 205, 242, 243–247, 249–251, 314, 349

[56] References Cited

U.S. PATENT DOCUMENTS

| | | |
|---|---|---|
| 1,997,873 | 4/1935 | Poplawski . |
| 2,284,155 | 5/1942 | Landgraf .................. 241/282.2 |
| 3,128,996 | 4/1964 | Kuzara .................. 366/314 |
| 3,315,946 | 4/1967 | Nissman .................. 366/205 X |
| 3,612,126 | 10/1971 | Emmons et al. .................. 241/199.12 |
| 3,713,628 | 1/1973 | Christensen .................. 366/314 |
| 3,785,579 | 1/1974 | Voglesonger .................. 241/282.1 |
| 3,786,999 | 1/1974 | Cabell .................. 366/205 X |
| 4,107,791 | 8/1978 | Mikituk .................. 366/205 |
| 4,297,038 | 10/1981 | Falkenbach .................. 241/282.1 X |

FOREIGN PATENT DOCUMENTS

| | | |
|---|---|---|
| 2928107 | 1/1981 | Fed. Rep. of Germany . |
| 3225591 | 10/1983 | Fed. Rep. of Germany . |
| 1119057 | 6/1956 | France . |
| 697182 | 11/1979 | U.S.S.R. .................. 241/282.1 |

Primary Examiner—Timothy F. Simone
Assistant Examiner—Charles Cooley
Attorney, Agent, or Firm—Young & Thompson

[57] ABSTRACT

A kitchen appliance, such as a mixer, has a housing (1) which has on its upper portion an annular seat (2) for reception of a removable bowl (3), and which encloses a motor (4) whose output shaft (5) projects from the seat. The bowl (3) has a removable bottom (6) constituted by a base of shape complementary to the seat (2) and whose central region bears a rotatable tool (7) integral with a shaft (7') traversing the base and adapted to couple with the output shaft (5) of the motor when the base is correctly mounted on the seat. The base (6) comprises at least one detent (16) which is movably mounted through the wall (12) of the base between a retracted position in which it permits positioning of the base on its seat (2) and thus the coupling of the tool (7) with the shaft (5) of the motor (4) and which position is reached when the bowl (3) is correctly secured on the base, and a projecting position in which it extends laterally of the base. The detent (16) has a portion (16') that comes into engagement with the upper region (17) of the seat (2) so as to prevent coupling of the tool (7) with the shaft (5) of the motor when the bowl (3) is not present or is incorrectly secured on the base.

5 Claims, 2 Drawing Sheets

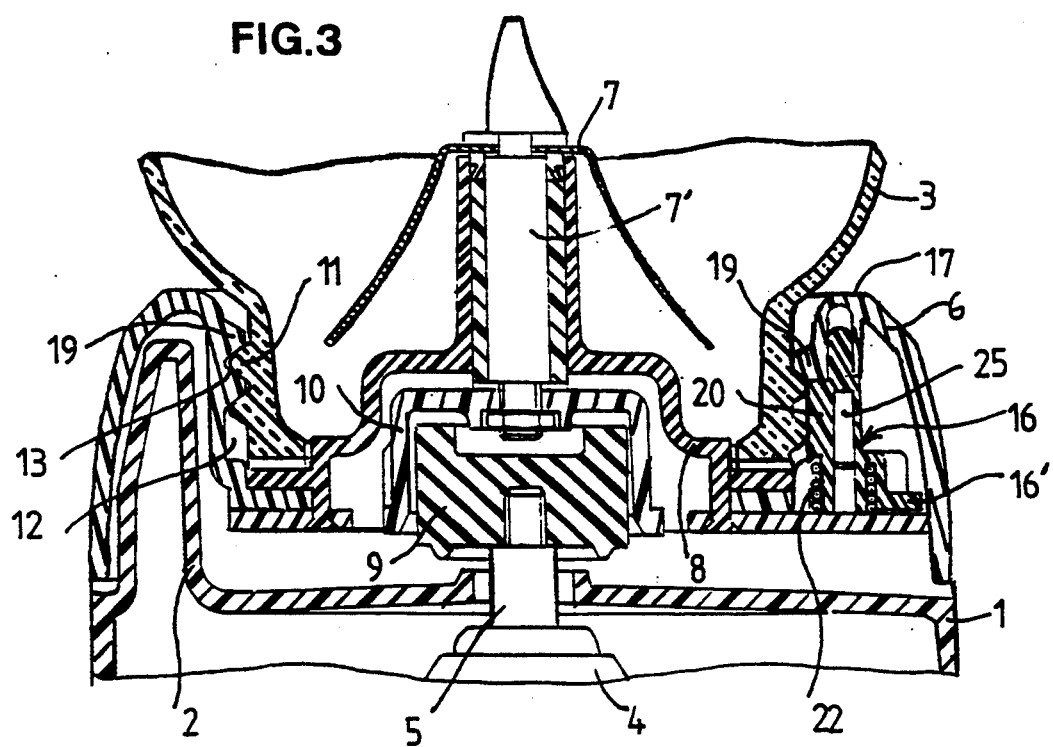
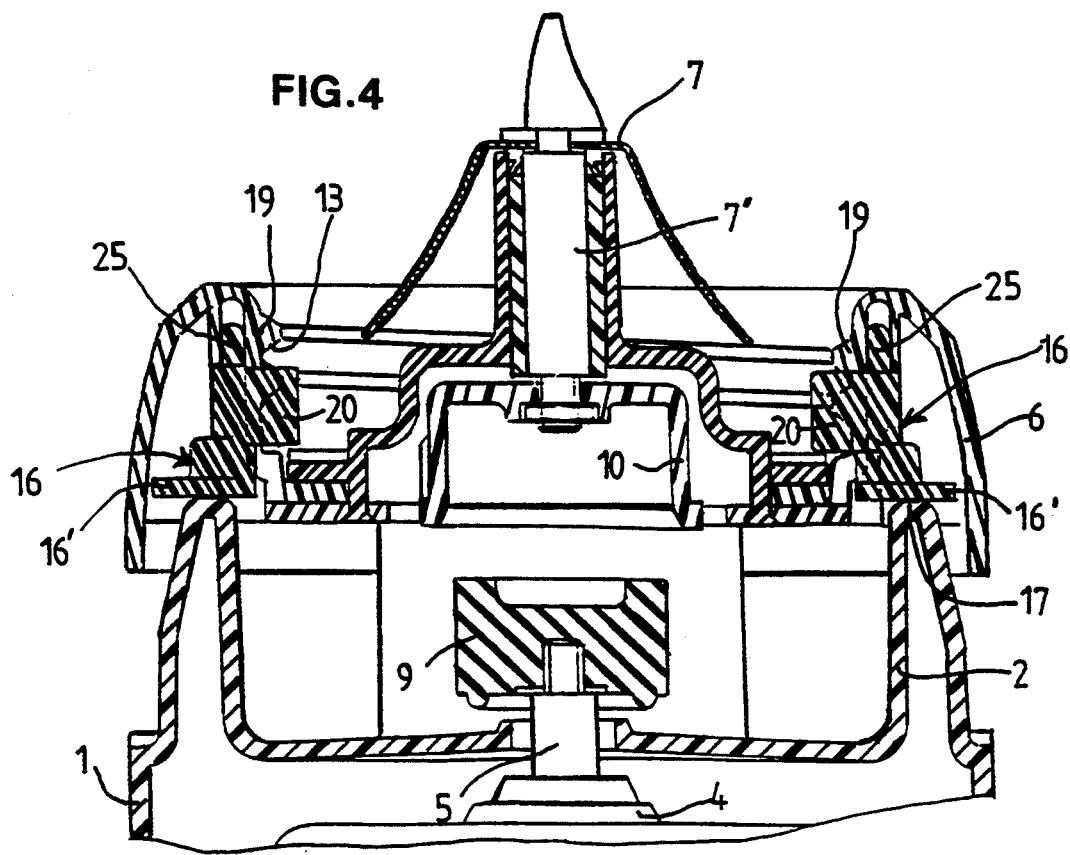

ns position.

KITCHEN APPLIANCE, SUCH AS A MIXER PROVIDED WITH A SAFETY RETRACTABLE DETENT

FIELD OF THE INVENTION

The invention relates to kitchen appliances, such as mixers, comprising a housing which has on its upper portion an annular seat for reception of a removable bowl, and which encloses a motor whose output shaft projects from said seat.

It concerns more precisely mixers in which the bowl comprises a removable bottom constituted by a base having a shape complimentary to the seat and whose central region carries a rotatable tool fixed to a shaft passing through said base and coupled with the output shaft of the motor when said base is correctly positioned on the seat.

BACKGROUND OF THE INVENTION

In known appliances of this type, it may happen that the user incorrectly fixes the bowl on the base, which gives rise, during rotation of the tool at high speed, to important relative motion between the bowl and the base which can even produce violent projections of liquid from the appliance. But the most serious drawback of this type of appliance is possible actuation of the appliance by a child with the bowl off the base, thereby risking serious injury.

The object of the present invention is to eliminate these drawbacks.

SUMMARY OF THE INVENTION

According to the invention, the base comprises at least one detent which is movably mounted through the wall of said base between a retracted position in which it permits positioning of the base on its seat and therefore the coupling of the tool with the motor shaft and to which it is brought by the correct securement of the bowl on the base, and a projecting position in which it extends laterally on a base and of which a portion comes into engagement with the upper region of the seat so as to prevent coupling of the tool with the motor shaft and to which it is automatically brought when the bowl is not present or is incorrectly positioned on the base.

Thus, thanks to this detent, it is impossible to achieve the coupling of the tool on the motor shaft when the bowl is not fixed or is incorrectly fixed on the base, thereby avoiding any risk of misfunction.

BRIEF DESCRIPTION OF THE DRAWINGS

The characteristics and advantages of the invention will become apparent from the description which follows, by way of example, with reference to the accompanying drawings, in which:

FIG. 3 is a fragmentary cross-sectional view similar to FIG. 1 of another embodiment of the detent according to the invention; and FIG. 4 is a view similar to FIG. 3 but showing the base without the bowl and the detents shown in elevation and in projecting position.

DETAILED DESCRIPTION OF THE INVENTION

Figure 1:
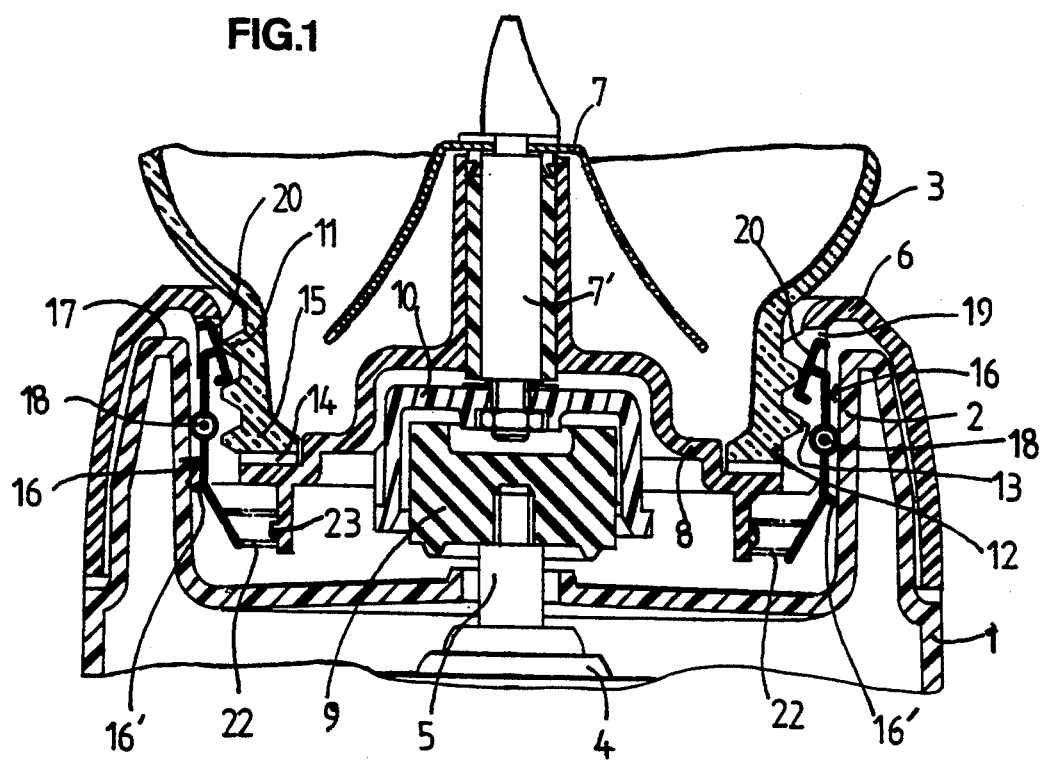
FIG. 1 is a fragmentary vertical cross-section of a kitchen appliance according to the invention, showing a bowl associated with a base provided with two detents in retracted position.
Figure 2:
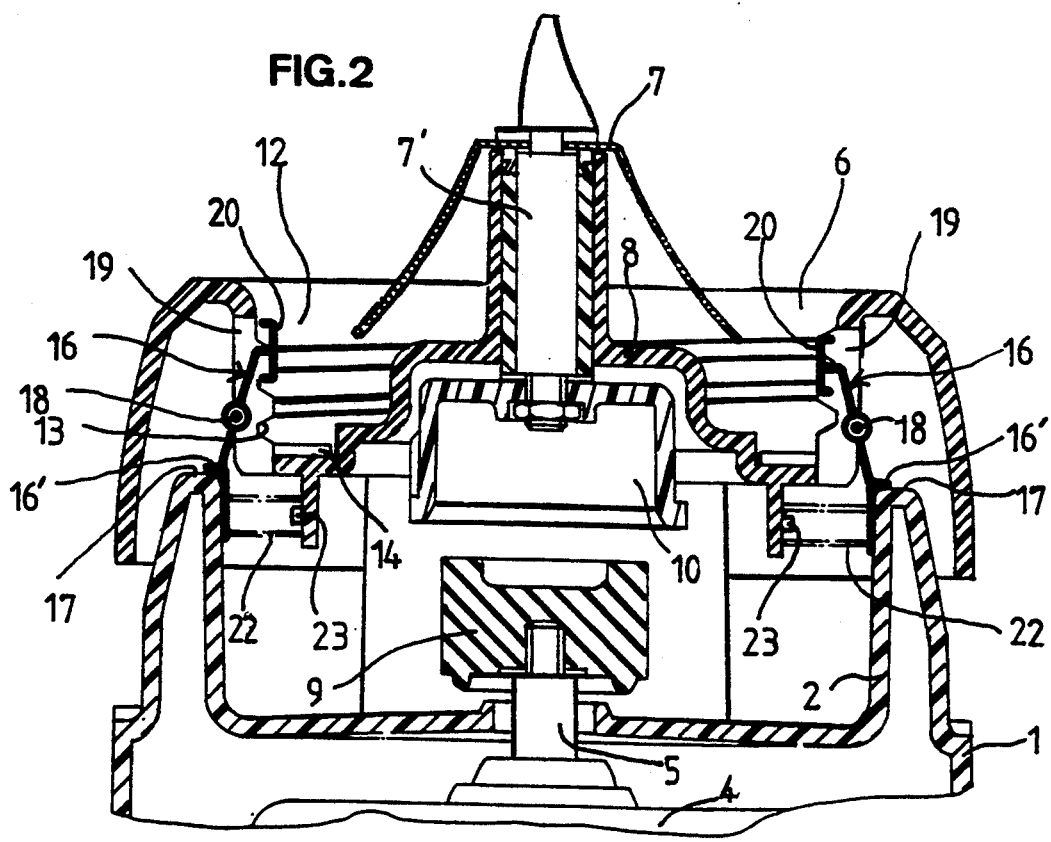
FIG. 2 is a view similar to FIG. 1 but showing the base without the bowl and the detent in projecting position.

As shown in FIGS. 1 and 2, the kitchen appliance is a mixer comprising a housing 1 which has on its upper surface an annular seat 2 in the form of a base adapted to receive a removable bowl 3, and which encloses an electric motor 4 whose output shaft 5 projects through the bottom of seat 2. As better shown in FIG. 2, the bowl 3 comprises a removable bottom 6 constituted by a base which has a shape complimentary to seat 2 and whose central region carries a rotatable tool 7, such as a knife, fixed to a shaft 7' passing through the bottom wall 8 of the base and adapted to couple with the output shaft 5 of the motor.

In known manner, the shaft 5 comprises a rubber drive 9, while the shaft 7' bears a rigid bell 10 adapted to cap the drive, over substantially all its height, when the base 6 is correctly seated on seat 2. The removable securement of the bowl 3 on the base 6 is obtained by means of securement by a screw threading, the bowl comprising for this purpose a helical rib 11 and the sidewall 12 of the base 6 comprising a helical groove 13 of a shape complementary to rib 11. So as to obtain a good seal of this securement, an annular joint 14 is interposed between the bottom 8 and the edge 15 of the bowl 3.

According to the invention, the base 6 comprises at least one detent 16 which is movably mounted through the lateral wall 12 of the base between a retracted position (FIGS. 1 and 3) in which it permits mounting of the base 6 on its seat 2 and therefore the coupling of the drive 9 and the bell 10 secured to the tool and to which it is brought by the correct positioning of the bowl 3 on the base 6, and a projecting position (FIGS. 2 and 4) in which it extends laterally to the base and therefore its portion 16' comes into engagement with the upper region 17 of the seat so as to prevent coupling of the bell 10 with the drive 9 of the motor and to which it is automatically brought when the bowl 3 is not present or is incorrectly fixed on the base 6.

According to a first embodiment as illustrated in FIGS. 1 and 2, the base 6 is provided with two diametrically opposed detents 16.

Each detent 16 has the shape of a lever and is pivotally mounted about a horizontal axle 18 through an opening 19 provided in the base 6. To this end, the detent comprises on opposite sides of the axle a portion 20 forming a finger whose actuation is effected by the emplacement of the bowl 3 on the base 6, as well as a portion 16' forming an abutment adapted to come into engagement with the upper region 17 of the seat 2 when the finger 20 is actuated by the bowl 3.

As shown, each detent 16 is movably mounted under the influence of elastic means 22, such as, for example, a compression spring provided between the detent and the seat 23 integral with the base 6. To facilitate actuation of the fingers 20, each finger projects from the opening 19 and extends along at least a sector of the helical groove 13 of the base 6.

According to a second embodiment showing FIGS. 3 and 4, and in which the same reference numerals are used to designate members analogous to those of FIGS. 1 and 2, the base 6 is provided with at least two diametrically opposed detents 16 and preferably four detents opposed two by two.

Each detent 16 is pivotally mounted about a vertical axle 25 through an opening 19 provided in the base 6 and comprises on opposite sides of the axle a portion 20 forming a finger whose actuation is effected by the emplacement of the bowl 3 on the base 6, as well as a portion 16' forming an abutment adapted to come into contact with the upper region 17 of the seat 2 when the finger 20 is actuated by the bowl 3.

As seen in FIG. 3, each detent 16 is movably mounted under the influence of elastic means 22, such as a torsion spring wound about the vertical axle 25 and of which one end is fixed to the base and the other end is attached to the detent 16 so as to return automatically the detent and therefore its portion 16' to the projecting position. In this embodiment, the finger 20 and the detent 16 are offset in height on the axle 25 so as to guarantee a space between the drive 9 and the bell 10 when the portion 16' comes into abutment with the upper portion 17 of the seat 2.

Thus, thanks to the invention, it will be understood that if the user does not correctly screw the bowl 3 on the base 6, or even does not emplace the bowl on said base, the actuating fingers 20 are not urged in the absence of the bowl or are incorrectly urged during improper screwing, and therefore the portions 16' forming an abutment are, under the influence of the springs 22, in projecting position and prevent any emplacement of the base 6 on the seat 2 by bearing on the upper region 17 of the seat 2. As a result, any coupling between the bell 10 and the knife 7 of the drive 9 is impossible. It will also be understood that by the arrangement and number of detents on the base, there will be prevented any improper actuation and thus there will be guaranteed absolute safety. To use the mixer, it is therefore necessary correctly to place the bowl 3 on the base 6 so as to actuate all the fingers 20 by means of the helical rib 11 of the bowl. If all the fingers 20 are correctly actuated, the portions 16' forming abutments occupy their retracted position (FIGS. 1 and 3) and permit the emplacement of the base 6 in the seat and therefore the coupling of the bell 10 with the drive 9.

It will be understood that by providing little play between the abutments 16' and the dish of the seat 2, it will be assured that the positioning will not be possible unless the fingers 20 are correctly actuated by the rib 11 and occupy the position intended by the manufacturer.

What is claimed is:

1. A kitchen appliance, comprising a housing having an upper portion constituting an annular seat in the form of a basin adapted to receive a removable bowl, said housing enclosing a motor having an output shaft projecting from said seat, said removable bowl having a removable bottom constituted by a base having a shape complementary to said seat, a rotatable tool mounted on a shaft traversing said base, said shaft adapted to couple with said output shaft of said motor, at least one retractable detent pivotally mounted about an axle on a lateral wall of said base and comprising on one side of said axle a portion forming a finger and on the other side of said axle a portion forming an abutment, said detent being movable between a retracted position in which said finger is actuated by the bowl and said base is seated on the seat when the bowl is correctly secured on the base so as to permit the coupling of the tool with the output shaft of said motor, and a projecting position in which said abutment is automatically engaged with an upper region of the seat when the bowl is not present or is incorrectly secured on the base so as to prevent the coupling of the tool with the output shaft of said motor, screw threaded securement means for securing the bowl on the base, said securement means including a helical rib provided in said bowl and a helical groove having a shape complementary to said rib and provided in said lateral wall of said base, said finger of the detent extending along at least a portion of said groove of the base.

2. The kitchen appliance as claimed in claim 1, wherein said axle of said detent horizontally extends through an opening provided in the base.

3. The kitchen appliance as claimed in claim 1, wherein said axle of said detent vertically extends through an opening provided in the base.

4. The kitchen appliance as claimed in claim 1, wherein said base is provided with at least two diametrically opposed detents.

5. The kitchen appliance as claimed in claim 1, further including elastic means between the detent and the seat for returning said detent to its projecting position.

* * * * *